US012035103B2

(12) United States Patent
Sun et al.

(10) Patent No.: US 12,035,103 B2
(45) Date of Patent: Jul. 9, 2024

(54) SPEAKER APPARATUS

(71) Applicant: HUAWEI TECHNOLOGIES CO., LTD., Guangdong (CN)

(72) Inventors: Kunmao Sun, Dongguan (CN); Yumin Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 241 days.

(21) Appl. No.: 17/512,816

(22) Filed: Oct. 28, 2021

(65) Prior Publication Data

US 2022/0053264 A1 Feb. 17, 2022

Related U.S. Application Data

(63) Continuation of application No. PCT/CN2019/124904, filed on Dec. 12, 2019.

(30) Foreign Application Priority Data

Apr. 29, 2019 (CN) ......................... 201920606974.2

(51) Int. Cl.
*H04R 9/02* (2006.01)
*H04R 1/34* (2006.01)

(52) U.S. Cl.
CPC ............... *H04R 1/345* (2013.01); *H04R 9/02* (2013.01); *H04R 2201/34* (2013.01)

(58) Field of Classification Search
CPC ................................................. H04R 2201/34
USPC ......................................................... 381/346
See application file for complete search history.

(56) References Cited

U.S. PATENT DOCUMENTS

| | | | | | |
|---|---|---|---|---|---|
| 4,496,021 | A * | 1/1985 | Berlant | G10K 11/025 | 181/152 |
| 4,620,317 | A * | 10/1986 | Anderson | H04R 1/345 | 381/160 |
| 5,268,538 | A * | 12/1993 | Queen | H04R 1/26 | 181/155 |
| 6,320,970 | B1 * | 11/2001 | Czerwinski | H04R 1/30 | 381/430 |
| 2007/0147647 | A1 | 6/2007 | Voishvillo | | |
| 2011/0085691 | A1 * | 4/2011 | Schultz | H04R 1/345 | 381/343 |

(Continued)

FOREIGN PATENT DOCUMENTS

| | | |
|---|---|---|
| CN | 106233752 A | 12/2016 |
| CN | 206728269 U | 12/2017 |
| CN | 108471577 A | 8/2018 |

*Primary Examiner* — Suhan Ni
(74) *Attorney, Agent, or Firm* — WOMBLE BOND DICKINSON (US) LLP

(57) ABSTRACT

This application provides a speaker apparatus includes: a speaker sound emission unit that includes a speaker diaphragm and configured to convert an electrical signal into a sound signal by using the speaker diaphragm; a horn includes a sound inlet and a sound outlet, the speaker sound emission unit is disposed on the sound inlet, and the horn is configured to amplify the sound signal and then propagate an amplified sound signal through the sound outlet; and a phase plug, configured to adjust a phase and/or an amplitude of the sound signal from the sound inlet; where relative locations of the speaker diaphragm and the phase plug remain unchanged to form an incompressible air cavity.

19 Claims, 3 Drawing Sheets

(56) References Cited

U.S. PATENT DOCUMENTS

| | | | | |
|---|---|---|---|---|
| 2011/0168480 | A1* | 7/2011 | Sterling ............... | H04R 1/2803<br>181/176 |
| 2019/0028801 | A1* | 1/2019 | Chen .................... | G10K 11/025 |

* cited by examiner

SPEAKER APPARATUS

CROSS-REFERENCE TO RELATED APPLICATIONS

This application is a continuation of International Application No. PCT/CN2019/124904, filed on Dec. 12, 2019, which claims priority to Chinese Patent Application No. 201920606974.2, filed on Apr. 29, 2019. The disclosures of the aforementioned applications are hereby incorporated by reference in their entireties.

TECHNICAL FIELD

The present disclosure relates to the field of imaging device technologies, and in particular, to a speaker apparatus.

BACKGROUND

Nowadays, with development of intelligent devices, speakers on the devices are more widely used, and therefore there are increasingly high requirements for the speakers. In a conventional technology, in a speaker system, a horn is disposed on a speaker sound emission unit, and then a phase plug is disposed inside the horn. Interference caused by a path difference is eliminated through path compensation of the phase plug, to optimize a sound amplification effect, and improve a reproduction degree and a fidelity degree of sound. However, when a high-frequency sound signal is output, severe attenuation is caused. Consequently, the speaker is not conducive to propagation of a sound signal at a high frequency.

SUMMARY

To overcome the foregoing problem, embodiments of this disclosure provide a speaker apparatus.

To achieve the foregoing objective, the following technical solutions are used in the embodiments of this disclosure. According to a first aspect, this disclosure provides a speaker apparatus. The speaker apparatus includes: a speaker sound emission unit that includes a speaker diaphragm, where the speaker sound emission unit is configured to convert an electrical signal into a sound signal by using the speaker diaphragm; a horn, where the horn includes a sound inlet and a sound outlet, the speaker sound emission unit is disposed on the sound inlet, and the horn is configured to amplify the sound signal and then propagate an amplified sound signal through the sound outlet; and a phase plug, configured to adjust a phase and/or an amplitude of the sound signal from the sound inlet; where relative locations of the speaker diaphragm and the phase plug remain unchanged to form an incompressible air cavity.

In an embodiment, a surface of the phase plug is parallel to an outer surface of the speaker diaphragm.

In an embodiment, a distance between the speaker diaphragm and the phase plug is less than a wavelength of the sound signal.

In an embodiment, the distance between the speaker diaphragm and the phase plug is 0.5 mm to 1 mm.

In an embodiment, the speaker apparatus further includes a bracket, and the phase plug is fastened inside the horn by using the bracket.

In an embodiment, there are three brackets, the phase plug is fastened inside the horn by using the three brackets, and the three brackets are placed symmetrically.

In an embodiment, the three brackets are placed at 120 degrees to each other.

In an embodiment, the horn, the phase plug, and the bracket are integrated in a manufacturing manner of one-time molding.

In an embodiment, the bracket is located on a plane on which the phase plug is located.

In an embodiment, a surface area of a surface of the phase plug is ½ to ⅔ times a surface area of an outer surface of the speaker diaphragm.

In an embodiment, a shape of the phase plug is circular, bowl-shaped, or hemispherical.

In an embodiment, the speaker diaphragm in the speaker sound emission unit, the horn, and the phase plug form the incompressible air cavity by fastening the speaker sound emission unit and the phase plug to the horn.

According to a second aspect, this disclosure further provides a speaker apparatus. The speaker apparatus includes: a speaker sound emission unit that includes a speaker diaphragm, where the speaker sound emission unit is configured to convert an electrical signal into a sound signal by using the speaker diaphragm; a horn, where the horn includes a sound inlet and a sound outlet, the speaker sound emission unit is disposed on the sound inlet, and the horn is configured to amplify the sound signal and then propagate an amplified sound signal through the sound outlet; and a phase plug, configured to adjust a phase and/or an amplitude of the sound signal from the sound inlet; where relative locations of the speaker diaphragm and the phase plug remain unchanged to form an air cavity, and a distance between the speaker diaphragm and the phase plug is less than a wavelength of the sound signal and is 0.5 mm to 1 mm.

According to the speaker apparatus provided in this disclosure, when the phase plug is disposed inside the horn and the distance between the phase plug and the speaker diaphragm is less than or far less than the wavelength $\lambda$ of the sound signal, the incompressible air cavity is formed between the speaker diaphragm and the phase plug, so that the sound signal is losslessly propagated to the horn through the incompressible air cavity. In this way, impedance $Z_{ms}$ of the speaker apparatus matches radiation impedance $Z_{mr}$ of sound of the speaker apparatus in propagation space. In addition, the radiation impedance $Z_{mr}$ of the sound of the speaker apparatus in the propagation space is increased, so that radiation efficiency of the speaker is improved, and output of the sound signal of the speaker apparatus at a high frequency is improved.

BRIEF DESCRIPTION OF DRAWINGS

The following briefly describes the accompanying drawings that need to be used in the descriptions of the embodiments.

DESCRIPTION OF EMBODIMENTS

The following describes the technical solutions in the embodiments of this disclosure with reference to the accompanying drawings in the embodiments of this disclosure.

In descriptions of this disclosure, locations or location relationships indicated by terms "center", "up", "down", "in front of", "behind", "left", "right", "vertical", "horizontal", "top", "bottom", "inside", "outside", and the like are based on locations or location relationships shown in the accompanying drawings, and are merely intended for ease of describing this disclosure and simplifying descriptions, instead of indicating or implying that a mentioned apparatus or component needs to be provided on a location or constructed and operated on a location, and therefore shall not be understood as limitations on this disclosure.

In the descriptions of this disclosure, it should be noted that, unless otherwise clearly specified and limited, terms "mount", "link", and "connect" should be understood in a broad sense, for example, may mean a fixed connection, may be a detachable connection, or may be a butt joint connection or an integrated connection. Persons of ordinary skill in the art can understand meanings of the foregoing terms in this disclosure based on cases.

Figure 1:
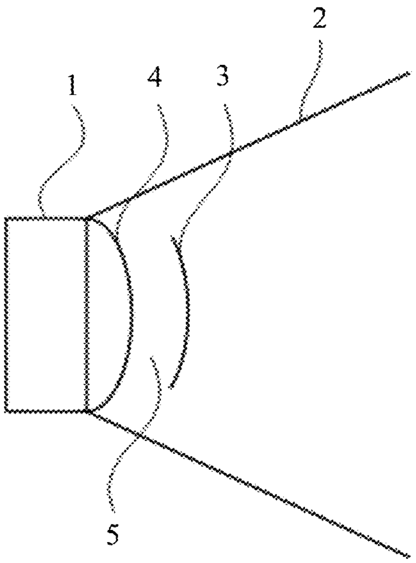
FIG. 1 is a schematic structural diagram of a speaker apparatus according to an embodiment of this disclosure.

FIG. 1 is a schematic structural diagram of a speaker apparatus according to an embodiment of this disclosure. The speaker apparatus shown in FIG. 1 includes a speaker sound emission unit 1, a horn 2, and a phase plug 3. The speaker sound emission unit 1 includes a speaker diaphragm 4. The speaker sound emission unit 1 converts an electrical signal into a sound signal by using the speaker diaphragm 4.

The horn 2 includes a sound inlet and a sound outlet. Generally, a radius of the sound inlet is less than that of the sound outlet. The sound inlet of the horn 2 is connected to the speaker sound emission unit 1, and then the speaker sound emission unit 1 enables the sound signal to enter the horn 2 from the sound inlet of the horn 2 through the speaker diaphragm 4. In this disclosure, the horn 2 is mounted on the speaker sound emission unit 1, to amplify the sound signal and then propagate an amplified sound signal through the sound outlet. In this way, a sound pressure level (an acoustic unit of volume) of the speaker sound emission unit 1 is increased, to improve a sound amplification effect.

In an embodiment of the disclosure, a main function of the horn 2 is to implement impedance matching. Implementation of impedance matching is mainly determined by two counters: an area of the speaker diaphragm 4 and a cross-sectional area of the sound outlet of the horn 2. A cross-sectional area of the sound inlet of the horn 2 and the cross-sectional area of the sound outlet of the horn 2 are designed based on the area of the speaker diaphragm 4. Impedance at the sound outlet of the horn 2 is converted into impedance at the sound inlet of the horn 2 based on a cross-sectional area ratio. The horn 2 implements impedance matching mainly based on the area ratio. Therefore, in this disclosure, the impedance at the sound inlet of the horn 2 and the impedance at the sound outlet of the horn 2 are changed by changing the cross-sectional area of the sound inlet of the horn 2 and the cross-sectional area of the sound outlet of the horn 2. In this way, impedance of the speaker matches radiation impedance of the speaker in space, to increase sound. In an actual case, a value of the area ratio needs to be adapted based on an actual size of the speaker diaphragm 4 and a structure of the horn 2.

In an embodiment, a shape of the horn 2 mentioned in an embodiment of the disclosure may be a catenoidal horn, a hyperbolic horn, an exponential horn, a conical horn, or the like, and a selected shape is related to a device to which the horn is applied. Corresponding horn shapes are selected for different devices based on space sizes designed inside the devices and reserved space shapes.

In an embodiment, when the speaker sound emission unit 1 is disposed on the sound inlet of the horn 2, an expression of radiation efficiency η of the speaker apparatus is as follows:

$$\eta = \frac{\Re(Z_{mr})}{\frac{\Re(Z_{eb})}{B^2L^2}|Z_{ms}|^2 + \Re(Z_{ms})},$$

where $Z_{ms}$ is impedance of the speaker apparatus, $Z_{eb}$ is impedance of a circuit system of the speaker apparatus, $Z_{mr}$ is radiation impedance of sound of the speaker apparatus in propagation space, $\Re$ means taking a real part, and BL is a magnetic force coefficient of the speaker apparatus.

Generally, the direct radiation efficiency η of the speaker is less than 1%. To improve the radiation efficiency of the speaker, the radiation impedance $Z_{mr}$ of the sound in the propagation space may be increased. A value of the radiation impedance $Z_{mr}$ of the sound of the speaker apparatus in the propagation space is related to a cross-sectional area of the horn 2. In other words, as the cross-sectional area of the horn 2 gradually increases, the radiation impedance $Z_{mr}$ also gradually increases. In this case, the radiation efficiency η is gradually improved.

The phase plug 3 is disposed inside the horn 2 and is located next to the speaker diaphragm 4, and relative locations of the phase plug 3 and the speaker diaphragm 4 remain unchanged to form an incompressible air cavity 5.

In a possible structure, a surface of one side that is of the phase plug 3 and that is close to the speaker diaphragm 4 is parallel to an outer surface of the speaker diaphragm 4.

In a possible structure, the incompressible air cavity 5 formed by the phase plug 3 and the speaker diaphragm 4 is even in thickness, to ensure that a same period of time is used when all sound signals pass through the incompressible air cavity 5.

In an embodiment, a shape of the speaker diaphragm 4 is usually circular, hemispherical, bowl-shaped, or the like.

It should be noted that, due to the foregoing structure in which the phase plug 3 is parallel to the speaker diaphragm 4 and the incompressible air cavity 5 formed by the phase plug 3 and the speaker diaphragm 4 is even in thickness, a shape of the phase plug 3 is similar to that of the speaker diaphragm 4, and may be circular, hemispherical, bowl-shaped, or the like.

The sound signal in this disclosure is a sound wave in a form of a longitudinal wave. In other words, alternate propagation of air molecules causes compression and expansion, to propagate sound. Because the air molecules need to consume energy during compression and expansion, the sound is lowered. If a distance between the speaker diaphragm 4 and the phase plug 3 is short enough, the incompressible air cavity is formed. The sound wave consumes no energy when being propagated in air inside the air cavity, so that lossless propagation of the sound wave is implemented.

The incompressible air cavity 5 may be equivalent to a stiffness capacitive reactance, and capacitive reactance brought by the incompressible air cavity 5 may be expressed as follows:

$$\chi = \frac{1}{\tan(kd)} = \frac{1}{\tan\left(2\pi\frac{d}{\lambda}\right)},$$

where k is a wave number of the sound signal, d is the distance between the speaker diaphragm 4 and the phase plug 3, and λ is a wavelength of the sound signal.

When d<<λ, $$\chi = \frac{1}{2\pi d},$$

and the capacitive reactance is quite large. In other words, air is incompressible. In this case, when the sound signal is propagated in a direction from the speaker diaphragm 4 to the phase plug 3, a velocity of the sound signal on the cross-sectional area remains unchanged, so that the sound signal is losslessly propagated to the horn 2 through the incompressible air cavity 5.

In other words, in an embodiment of the disclosure, the distance d between the speaker diaphragm 4 and the phase plug 3 needs to be far less than the wavelength λ of the sound signal, so that the sound signal can be propagated losslessly inside the incompressible air cavity 5 formed between the speaker diaphragm 4 and the phase plug 3.

For the wavelength λ of the sound signal, it can be learned according to a wavelength formula $$\lambda = \frac{v}{f}$$

that a higher frequency of the sound signal leads to a shorter wavelength. When the speaker apparatus provided in an embodiment of the disclosure propagates a sound signal at a frequency of 2 kHz to 20 kHz, a wavelength of the sound signal passing through the incompressible air cavity 5 is 0.017 m to 0.17 m. Therefore, the distance d between the speaker diaphragm 4 and the phase plug 3 needs to be less than 0.17 m.

In an embodiment, based on measurement in actual application, the most appropriate distance between the speaker diaphragm 4 and the phase plug 3 in an embodiment of the disclosure is 0.5 mm to 1 mm.

In an embodiment, the speaker diaphragm 4 may be disposed on the sound inlet of the horn 2, and then other components of the speaker sound emission unit 1 may be disposed on the horn. Because the thickness of the incompressible air cavity 5 formed between the speaker diaphragm 4 and the phase plug 3 needs to be quite small, it is difficult to control the distance between the speaker diaphragm 4 and the phase plug 3 in a process of disposing the speaker sound emission unit 1 on the horn 2. In this case, the speaker diaphragm 4 is first mounted on the horn 2 to enable the speaker diaphragm 4 and the phase plug 3 to form the incompressible air cavity 5, and then the other components of the speaker sound emission unit 1 are mounted. This avoids an error caused by assembly of the speaker sound emission unit 1 and the phase plug 3.

In an embodiment of the disclosure, the phase plug 3 may be made of a material such as plastic or metal. A surface area of a surface of one side that is of the phase plug 3 and that is close to the speaker diaphragm 4 is ½ to ⅔ times a surface area of an outer surface of the speaker diaphragm 4. If the surface area of the phase plug 3 is excessively small, the phase plug 3 cannot form an incompressible cavity. In addition, the surface area of the phase plug 3 needs to be less than a cross-sectional area at a fixed location inside the horn 2, so that there is a gap between the phase plug 3 and the horn 2 to ensure that the sound signal is propagated through the gap between the phase plug 3 and the horn 2.

Herein, the surface area of the outer surface of the speaker diaphragm 4 is a surface area of an outer surface of an effective sound vibration part that is of the speaker diaphragm 4 and that is disposed on the sound inlet of the horn 2.

In addition, the speaker apparatus provided in this disclosure further includes a bracket 6. Because the surface area of the phase plug 3 is usually less than a cross-sectional area inside the horn 2, the phase plug 3 is fastened inside the horn 2 by using the bracket 6, to ensure that a location of the phase plug 3 remains unchanged during propagation of the sound signal inside the horn 2, and that the sound signal is smoothly propagated through the gap between the phase plug 3 and the horn 2.

In an embodiment, there are three brackets 6 in this disclosure, one end of each of the three brackets 6 is connected to an edge of the phase plug 3, and the other end of each of the three brackets 6 is fastened inside the horn. In a direction from the sound outlet of the horn 2 to the sound inlet of the horn 2, the three brackets 6 are placed at 120 degrees to each other. The phase plug 3 is fastened to the horn 2 by using the three brackets 6, so that the location of the phase plug 3 does not change with propagation of the sound signal, to ensure that the relative locations of the phase plug 3 and the speaker diaphragm 4 remain unchanged to form the incompressible air cavity 5.

A manner of connecting the bracket 6 and the phase plug 3 and a manner of fastening the bracket 6 and the horn 2 are connection manners in the conventional technology, and are not limited in this disclosure. Moreover, a quantity of brackets 6 is not limited to three, and may be increased or decreased according to an actual requirement.

It should be noted that a manner of fastening the phase plug 3 in this disclosure is not limited to the fastening manner proposed in the foregoing embodiment, but may be any other manner.

Figure 2:
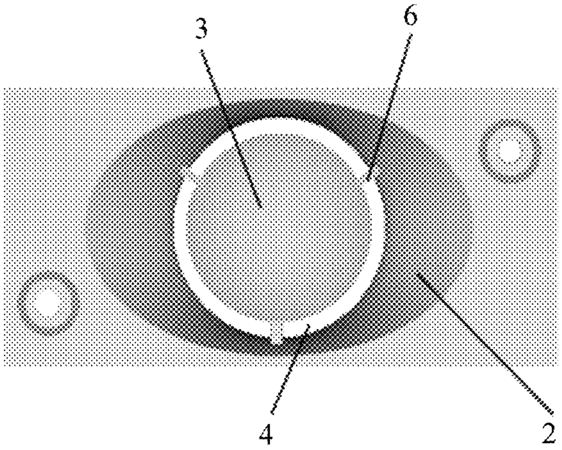
FIG. 2 is a schematic diagram of an elevational structure of a manner of fastening a phase plug according to an embodiment of this disclosure.
Figure 3:
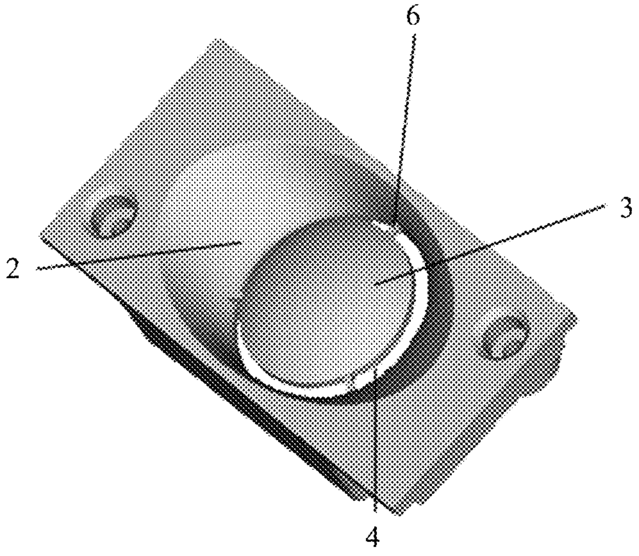
FIG. 3 is a schematic diagram of an oblique 45-degree elevational structure of a manner of fastening a phase plug according to an embodiment of this disclosure.

FIG. 2 and FIG. 3 are schematic diagrams of an elevational structure and an oblique 45-degree elevational structure of a manner of fastening a phase plug according to embodiments of this disclosure. As shown in the figures, in an embodiment, the horn 2, the phase plug 3, and the bracket 6 may be assembled in a one-time molding manner during manufacturing of the speaker apparatus, so that the horn 2, the phase plug 3, and the bracket 6 are integrated. This avoids errors caused by assembly between the bracket 6 and the horn 2 and assembly between the bracket 6 and the phase plug 3, and reduces manufacturing costs.

The brackets 6 need to be evenly distributed between the horn 2 and the phase plug 3, to ensure that the sound signals are evenly propagated through the gap between the horn 2 and the phase plug 3.

In an embodiment, the bracket 6 is not located on a plane on which the phase plug 3 is located.

In an embodiment, the bracket 6 needs to be located on a plane on which the phase plug 3 is located, to ensure that the phase plug 3 is parallel to the outer surface of the speaker diaphragm 4. In this case, a shape of the phase plug 3 is circular, hemispherical, or the like.

Figure 4:
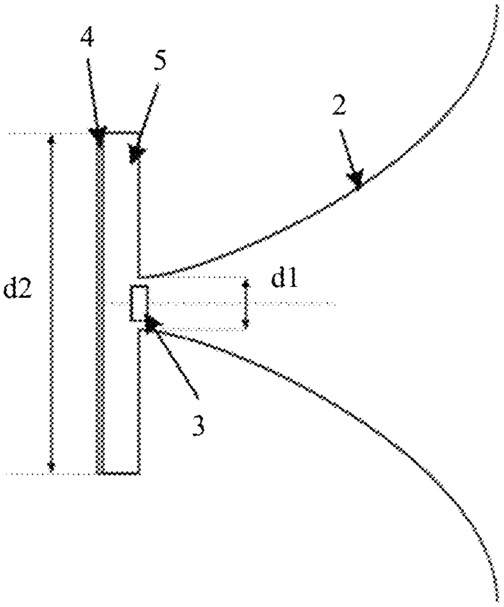
FIG. 4 is a schematic diagram of a speaker apparatus including an exponential horn according to an embodiment of this disclosure.

In an embodiment, the bracket 6 needs to be located on a plane on which the phase plug 3 is located, and the incompressible air cavity 5 formed between the phase plug 3 and the speaker diaphragm 4 is even in thickness, to ensure that a same period of time is used when all sound signals pass through the incompressible air cavity 5. FIG. 4 is a schematic diagram of a speaker apparatus including an exponential horn according to an embodiment of this disclosure. As shown in FIG. 4, in an embodiment, using an exponential horn as an example, a phase plug 3 is disposed on a sound inlet of a horn 2, and a speaker sound emission unit 1 is connected to the sound inlet of the horn 2. In this case, a speaker diaphragm 4, the horn 2, and the phase plug 3 form an incompressible air cavity 5.

After the speaker diaphragm 4 vibrates and emits a sound wave, the sound wave is losslessly propagated to the horn 2 through the incompressible air cavity 5, and then is propagated through a horn 2. In this case, a diameter of a cross-sectional area of the sound inlet of the horn 2 is increased from original d1 to d2, so that impedance $Z_{ms}$ of the speaker apparatus matches radiation impedance $Z_{mr}$ of sound of the speaker apparatus in propagation space. In addition, the radiation impedance $Z_{mr}$ of the sound of the speaker apparatus in the propagation space is increased, so that radiation efficiency of the speaker is improved, and output of a sound signal of the speaker apparatus at a high frequency is improved.

Figure 5:
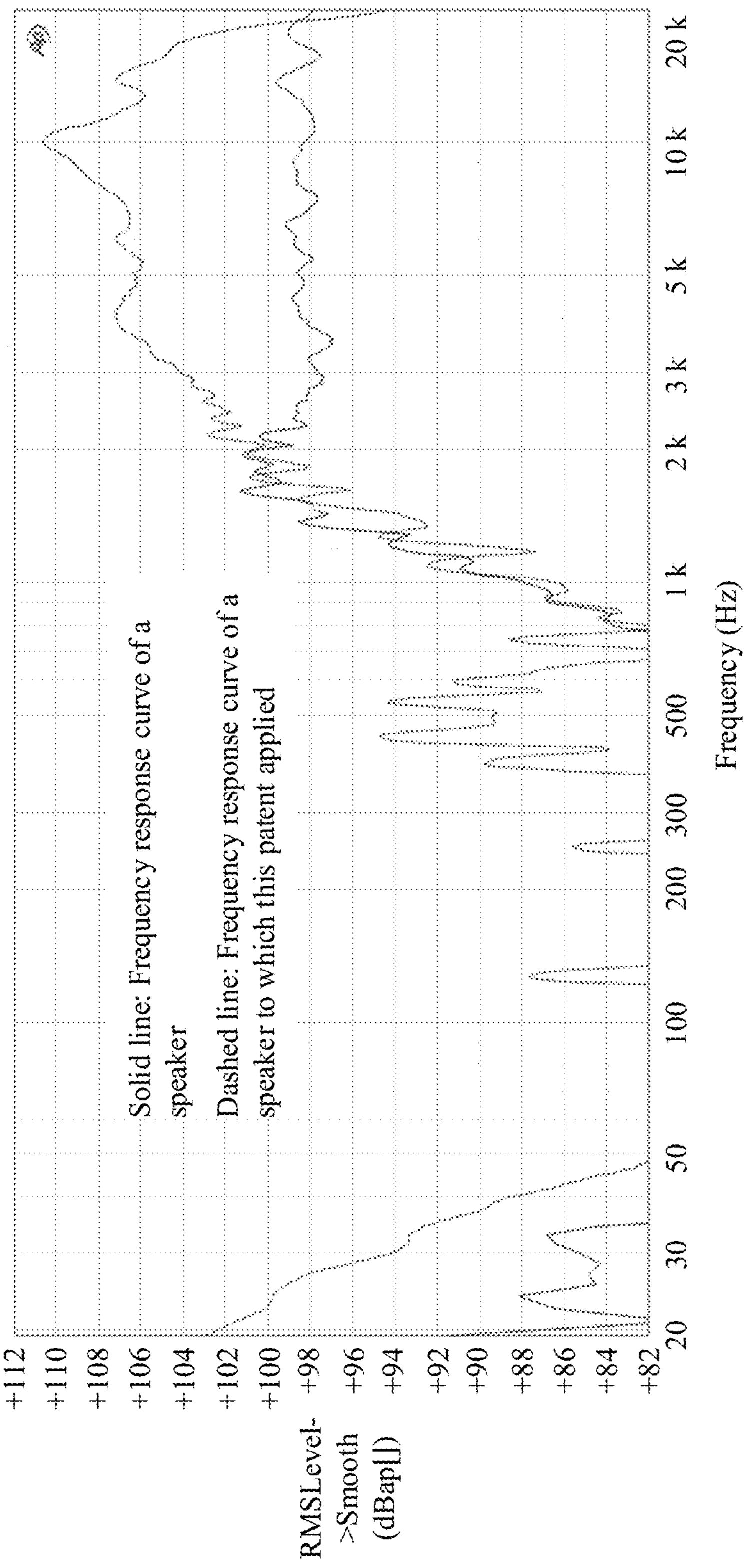
FIG. 5 is a schematic diagram of a frequency curve of an enhanced sound signal of a speaker apparatus including an exponential horn according to an embodiment of this disclosure.

As shown in FIG. 5, it can be learned from an actual test result that, based on measurement performed by a detection apparatus, the incompressible air cavity 5 is formed between the speaker diaphragm 4 and the phase plug 3, and then the sound wave is propagated to the horn through the incompressible air cavity 5, and then is propagated through a sound outlet. A structure of the speaker apparatus in this disclosure enables propagation and enhancement of a high-frequency sound signal, and the sound wave is enhanced by 8 dB to 10 dB in a frequency range of 2 kHz to 20 kHz.

According to the speaker apparatus provided in this disclosure, when the phase plug is disposed inside the horn and the distance between the phase plug and the speaker diaphragm is less than or far less than the wavelength 2\, of the sound signal, the incompressible air cavity 5 is formed between the speaker diaphragm and the phase plug, so that the sound signal is losslessly propagated to the horn through the incompressible air cavity. In this way, the impedance $Z_{ms}$ of the speaker apparatus matches the radiation impedance $Z_{mr}$ of the sound of the speaker apparatus in the propagation space. In addition, the radiation impedance $Z_{mr}$ of the sound of the speaker apparatus in the propagation space is increased, so that radiation efficiency of the speaker is improved, and output of the sound signal of the speaker apparatus at a high frequency is improved.

An embodiment of this disclosure further provides a speaker apparatus. The apparatus includes a speaker sound emission unit 1, a horn 2, a phase plug 3, and an incompressible air cavity 5.

The speaker sound emission unit 1 includes a speaker diaphragm 4. The speaker sound emission unit 1 converts an electrical signal into a sound signal by using the speaker diaphragm 4.

The horn 2 includes a sound inlet and a sound outlet. Generally, a radius of the sound inlet is less than that of the sound outlet. The sound inlet of the horn 2 is connected to the speaker sound emission unit 1, and then the speaker sound emission unit 1 enables the sound signal to enter the horn 2 from the sound inlet of the horn 2 through the speaker diaphragm 4. In this disclosure, the horn 2 is mounted on the speaker sound emission unit 1, to amplify the sound signal and then propagate an amplified sound signal through the sound outlet. In this way, a sound pressure level of the speaker sound emission unit 1 is increased, to improve a sound amplification effect.

In an embodiment of the disclosure, a main function of the horn 2 is to implement impedance matching. Implementation of impedance matching is mainly determined by two counters: an area of the speaker diaphragm 4 and a cross-sectional area of the sound outlet of the horn 2. A cross-sectional area of the sound inlet of the horn 2 and the cross-sectional area of the sound outlet of the horn 2 are designed based on the area of the speaker diaphragm 4. Impedance at the sound outlet of the horn 2 is converted into impedance at the sound inlet of the horn 2 based on a cross-sectional area ratio. The horn 2 implements impedance matching mainly based on the area ratio. Therefore, in this disclosure, the impedance at the sound inlet of the horn 2 and the impedance at the sound outlet of the horn 2 are changed by changing the cross-sectional area of the sound inlet of the horn 2 and the cross-sectional area of the sound outlet of the horn 2. In this way, impedance of the speaker matches radiation impedance of the speaker in space, to increase sound. In an actual case, a value of the area ratio needs to be adapted based on an actual size of the speaker diaphragm 4 and a structure of the horn 2.

In an embodiment, a shape of the horn 2 mentioned in an embodiment of the disclosure may be a catenoidal horn, a hyperbolic horn, an exponential horn, a conical horn, or the like, and a selected shape is related to a device to which the horn is applied. Corresponding horn shapes are selected for different devices based on space sizes designed inside the devices and reserved space shapes.

In an embodiment, when the speaker sound emission unit 1 is disposed on the sound inlet of the horn 2, an expression of radiation efficiency 11 of the speaker apparatus is as follows:

$$\eta = \frac{\Re(Z_{mr})}{\frac{\Re(Z_{eb})}{B^2L^2}|Z_{ms}|^2 + \Re(Z_{ms})},$$

where $Z_{ms}$ is impedance of the speaker apparatus, $Z_{eb}$ is impedance of a circuit system of the speaker apparatus, $Z_{mr}$ is radiation impedance of sound of the speaker apparatus in propagation space, $\Re$ means taking a real part, and BL is a magnetic force coefficient of the speaker apparatus.

Generally, the direct radiation efficiency 11 of the speaker is less than 1%. To improve the radiation efficiency of the speaker, the radiation impedance $Z_{mr}$ of the sound in the propagation space may be increased. A value of the radiation impedance $Z_{mr}$ of the sound of the speaker apparatus in the propagation space is related to a cross-sectional area of the horn 2. In other words, as the cross-sectional area of the horn 2 gradually increases, the radiation impedance $Z_{mr}$ also gradually increases. In this case, the radiation efficiency 11 is gradually improved.

The phase plug 3 is disposed inside the horn 2 and is located next to the speaker diaphragm 4, and relative locations of the phase plug 3 and the speaker diaphragm 4 remain unchanged to form the incompressible air cavity 5.

In a possible structure, a surface of one side that is of the phase plug 3 and that is close to the speaker diaphragm 4 is parallel to an outer surface of the speaker diaphragm 4.

In a possible structure, the incompressible air cavity 5 formed by the phase plug 3 and the speaker diaphragm 4 is even in thickness, to ensure that a same period of time is used when all sound signals pass through the incompressible air cavity 5.

In an embodiment, a shape of the speaker diaphragm 4 is usually circular, hemispherical, bowl-shaped, or the like.

It should be noted that, due to the foregoing structure in which the phase plug 3 is parallel to the speaker diaphragm 4 and the incompressible air cavity 5 formed by the phase plug 3 and the speaker diaphragm 4 is even in thickness, a shape of the phase plug 3 is similar to that of the speaker diaphragm 4, and may be circular, hemispherical, bowl-shaped, or the like.

The sound signal in this disclosure is a sound wave in a form of a longitudinal wave. In other words, alternate propagation of air molecules causes compression and expansion, to propagate sound. Because the air molecules need to consume energy during compression and expansion, the sound is lowered. If a distance between the speaker diaphragm 4 and the phase plug 3 is short enough, the incompressible air cavity is formed. The sound wave consumes no energy when being propagated in air inside the air cavity, so that lossless propagation of the sound wave is implemented.

The incompressible air cavity 5 may be equivalent to a stiffness capacitive reactance, and capacitive reactance brought by the incompressible air cavity 5 may be expressed as follows:

$$X = \frac{1}{\tan(kd)} = \frac{1}{\tan\left(2\pi\frac{d}{\lambda}\right)},$$

When d<<λ, $$X = \frac{1}{2\pi d},$$

and the capacitive reactance is quite large. In other words, air is incompressible. In this case, when the sound signal is propagated in a direction from the speaker diaphragm 4 to the phase plug 3, a velocity of the sound signal on the cross-sectional area remains unchanged, so that the sound signal is losslessly propagated to the horn 2 through the incompressible air cavity 5.

In other words, in an embodiment of the disclosure, the distance d between the speaker diaphragm 4 and the phase plug 3 needs to be far less than a wavelength λ of the sound signal, so that the sound signal can be propagated losslessly inside the incompressible air cavity 5 formed between the speaker diaphragm 4 and the phase plug 3.

For the wavelength λ of the sound signal, it can be learned according to a wavelength formula $$\lambda = \frac{v}{f}$$

that a higher frequency of the sound signal leads to a shorter wavelength. When the speaker apparatus provided in an embodiment of the disclosure propagates a sound signal at a frequency of 2 kHz to 20 kHz, a wavelength of the sound signal passing through the incompressible air cavity 5 is 0.017 m to 0.17 m. Therefore, the distance d between the speaker diaphragm 4 and the phase plug 3 needs to be less than 0.17 m.

In an embodiment, based on measurement in actual application, the most appropriate distance between the speaker diaphragm 4 and the phase plug 3 in an embodiment of the disclosure is 0.5 mm to 1 mm.

In an embodiment, the speaker diaphragm 4 may be disposed on the sound inlet of the horn 2, and then other components of the speaker sound emission unit 1 may be disposed on the horn. Because the thickness of the incompressible air cavity 5 formed between the speaker diaphragm 4 and the phase plug 3 needs to be quite small, it is difficult to control the distance between the speaker diaphragm 4 and the phase plug 3 in a process of disposing the speaker sound emission unit 1 on the horn 2. In this case, the speaker diaphragm 4 is first mounted on the horn 2 to enable the speaker diaphragm 4 and the phase plug 3 to form the incompressible air cavity 5, and then the other components of the speaker sound emission unit 1 are mounted. This avoids an error caused by assembly of the speaker sound emission unit 1 and the phase plug 3.

In an embodiment of the disclosure, the phase plug 3 may be made of a material such as plastic or metal. A surface area of a surface of one side that is of the phase plug 3 and that is close to the speaker diaphragm 4 is ½ to ⅔ times a surface area of an outer surface of the speaker diaphragm 4. If the surface area of the phase plug 3 is excessively small, the phase plug 3 cannot form an incompressible cavity. In addition, the surface area of the phase plug 3 needs to be less than a cross-sectional area at a fixed location inside the horn 2, so that there is a gap between the phase plug 3 and the horn 2 to ensure that the sound signal is propagated through the gap between the phase plug 3 and the horn 2.

Herein, the surface area of the outer surface of the speaker diaphragm 4 is a surface area of an outer surface of an effective sound vibration part that is of the speaker diaphragm 4 and that is disposed on the sound inlet of the horn 2.

In addition, the speaker apparatus provided in this disclosure further includes a bracket 6. Because the surface area of the phase plug 3 is usually less than a cross-sectional area inside the horn 2, the phase plug 3 is fastened inside the horn 2 by using the bracket 6, to ensure that a location of the phase plug 3 remains unchanged during propagation of the sound signal inside the horn 2, and that the sound signal is smoothly propagated through the gap between the phase plug 3 and the horn 2.

In an embodiment, the horn 2, the phase plug 3, and the bracket 6 may be assembled in a one-time molding manner during manufacturing of the speaker apparatus, so that the horn 2, the phase plug 3, and the bracket 6 are integrated. This avoids errors caused by assembly between the bracket 6 and the horn 2 and assembly between the bracket 6 and the phase plug 3, and reduces manufacturing costs.

The brackets 6 need to be evenly distributed between the horn 2 and the phase plug 3, to ensure that the sound signals are evenly propagated through the gap between the horn 2 and the phase plug 3.

In an embodiment, there are three brackets 6 in this disclosure, one end of each of the three brackets 6 is connected to an edge of the phase plug 3, and the other end of each of the three brackets 6 is fastened inside the horn. In a direction from the sound outlet of the horn 2 to the sound inlet of the horn 2, the three brackets 6 are placed at 120 degrees to each other. The phase plug 3 is fastened to the horn 2 by using the three brackets 6, so that the location of the phase plug 3 does not change with propagation of the sound signal, to ensure that the relative locations of the phase plug 3 and the speaker diaphragm 4 remain unchanged to form the incompressible air cavity 5.

A manner of connecting the bracket 6 and the phase plug 3 and a manner of fastening the bracket 6 and the horn 2 are connection manners in the conventional technology, and are not limited in this disclosure. Moreover, a quantity of brackets 6 is not limited to three, and may be increased or decreased according to an actual requirement.

It should be noted that a manner of fastening the phase plug 3 in this disclosure is not limited to the fastening manner proposed in the foregoing embodiment, but may be any other manner.

In an embodiment, the bracket 6 is not located on a plane on which the phase plug 3 is located.

In an embodiment, the bracket 6 needs to be located on a plane on which the phase plug 3 is located, to ensure that the phase plug 3 is parallel to the outer surface of the speaker diaphragm 4. In this case, a shape of the phase plug 3 is circular, hemispherical, or the like.

In an embodiment, the bracket 6 needs to be located on a plane on which the phase plug 3 is located, and the incompressible air cavity 5 formed between the phase plug 3 and the speaker diaphragm 4 is even in thickness, to ensure that a same period of time is used when all sound signals pass through the incompressible air cavity 5.

Generally, the direct radiation efficiency $\eta$ of the speaker is less than 1%. To improve the radiation efficiency of the speaker, the radiation impedance $Z_{mr}$ of the sound in the propagation space may be increased. By using the apparatus, impedance matching between the direct radiation impedance $Z_{ms}$ of the speaker and the radiation impedance $Z_{mr}$ of the speaker in space is first implemented. A value of the radiation impedance $Z_{mr}$ of the sound of the speaker apparatus in the propagation space is related to a cross-sectional area of the horn 2. In other words, as the cross-sectional area of the horn 2 gradually increases, the radiation impedance $Z_{mr}$ also gradually increases. In this case, the radiation efficiency 11 is gradually improved, and output of the sound signal of the apparatus in this disclosure at a high frequency is improved.

It should be noted that the speaker apparatus provided in this disclosure may be applied to all audio devices such as an AI audio device, a sound bar, a television set, a notebook computer, and a smartphone.

Certainly, a plurality of speaker apparatuses provided in this disclosure may form one speaker array, and the speaker array is applied to large gathering sites such as a conference room and a concert, to increase application scenarios of the speaker apparatus provided in this disclosure.

In the descriptions of this specification, the described features, structures, materials, or characteristics may be combined in a proper manner in any one or more of the embodiments or examples.

Finally, it should be noted that the foregoing embodiments are merely intended for describing the technical solutions of this disclosure, but for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this disclosure.

What is claimed is:

1. A speaker apparatus, comprising:
- a speaker sound emission unit having a speaker diaphragm, wherein the speaker sound emission unit is configured to convert an electrical signal into a sound signal by using the speaker diaphragm;
- a horn having a sound inlet and a sound outlet, wherein the speaker sound emission unit is disposed on the sound inlet, and wherein the horn is configured to amplify the sound signal and then propagate an amplified sound signal through the sound outlet; and
- a phase plug configured to adjust a phase and/or an amplitude of the sound signal from the sound inlet, wherein a distance between the speaker diaphragm and the phase plug is less than a wavelength of the sound signal, and relative locations of the speaker diaphragm and the phase plug remain unchanged to form an incompressible air cavity with a stiffness capacitive reactance, so that the sound signal can be propagated losslessly inside the incompressible air cavity formed between the speaker diaphragm and the phase plug.

2. The apparatus according to claim 1, wherein a surface of the phase plug is parallel to an outer surface of the speaker diaphragm.

3. The apparatus according to claim 1, wherein the distance between the speaker diaphragm and the phase plug is 0.5 millimeters (mm) to 1 mm.

4. The apparatus according to claim 1, further comprising a bracket, wherein the phase plug is fastened inside the horn by using the bracket.

5. The apparatus according to claim 4, wherein there are three brackets, wherein the phase plug is fastened inside the horn by using the three brackets, and wherein the three brackets are placed symmetrically.

6. The apparatus according to claim 5, wherein the three brackets are placed at 120 degrees to each other.

7. The apparatus according to claim 4, wherein the horn, the phase plug, and the bracket are integrated in a manufacturing manner of one-time molding.

8. The apparatus according to claim 4, wherein the bracket is located on a plane on which the phase plug is located.

9. The apparatus according to claim 1, wherein a surface area of a surface of one side of the phase plug close to the speaker diaphragm is ½ to ⅔ times a surface area of an outer surface of the speaker diaphragm.

10. The apparatus according to claim 1, wherein a shape of the phase plug is circular, hemispherical, or bowl-shaped.

11. The apparatus according to claim 1, wherein the speaker diaphragm in the speaker sound emission unit, the horn, and the phase plug form the incompressible air cavity by fastening the speaker sound emission unit and the phase plug to the horn.

12. A speaker apparatus, comprising:
- a speaker sound emission unit having a speaker diaphragm, wherein the speaker sound emission unit is configured to convert an electrical signal into a sound signal by using the speaker diaphragm;
- a horn having a sound inlet and a sound outlet, wherein the speaker sound emission unit is disposed on the sound inlet, and wherein the horn is configured to amplify the sound signal and then propagate an amplified sound signal through the sound outlet; and
- a phase plug configured to adjust a phase and/or an amplitude of the sound signal from the sound inlet, wherein relative locations of the speaker diaphragm and the phase plug remain unchanged to form an incompressible air cavity, and a distance between the speaker diaphragm and the phase plug is less than a wavelength of the sound signal and is 0.5 millimeters (mm) to 1 mm to form the incompressible air cavity with a stiffness capacitive reactance, so that the sound signal can be propagated losslessly inside the incompressible air cavity formed between the speaker diaphragm and the phase plug.

13. The apparatus according to claim 12, wherein a surface of the phase plug is parallel to an outer surface of the speaker diaphragm.

14. The apparatus according to claim 12, further comprising a bracket, wherein the phase plug is fastened inside the horn by using the bracket.

15. The apparatus according to claim 14, wherein there are three brackets, wherein the phase plug is fastened inside the horn by using the three brackets, and wherein the three brackets are placed symmetrically.

16. The apparatus according to claim 15, wherein the three brackets are placed at 120 degrees to each other.

17. The apparatus according to claim 14, wherein the horn, the phase plug, and the bracket are integrated in a manufacturing manner of one-time molding.

18. The apparatus according to claim 14, wherein the bracket is located on a plane on which the phase plug is located.

19. The apparatus according to claim 12, wherein a surface area of a surface of one side of the phase plug close to the speaker diaphragm is ½ to ⅔ times a surface area of an outer surface of the speaker diaphragm.

* * * * *